United States Patent
Ryan et al.

(10) Patent No.: US 9,334,835 B2
(45) Date of Patent: May 10, 2016

(54) DERATE STRATEGY FOR EGR COOLER PROTECTION

(75) Inventors: Steven M. Ryan, Aurora, IL (US); Matthew C. Belt, Downers Grove, IL (US)

(73) Assignee: International Engine Intellectual Property Company, LLC

( * ) Notice: Subject to any disclaimer, the term of this patent is extended or adjusted under 35 U.S.C. 154(b) by 0 days.

(21) Appl. No.: 14/395,160

(22) PCT Filed: Apr. 17, 2012

(86) PCT No.: PCT/US2012/033974
§ 371 (c)(1),
(2), (4) Date: Oct. 17, 2014

(87) PCT Pub. No.: WO2013/158082
PCT Pub. Date: Oct. 24, 2013

(65) Prior Publication Data
US 2015/0075505 A1      Mar. 19, 2015

(51) Int. Cl.
*F02M 25/07* (2006.01)
*F01P 11/16* (2006.01)
*F01P 11/18* (2006.01)
*F02D 41/00* (2006.01)

(52) U.S. Cl.
CPC ............ *F02M 25/0738* (2013.01); *F01P 11/16* (2013.01); *F01P 11/18* (2013.01); *F02M 25/0731* (2013.01); F02D 2041/0067 (2013.01); Y02T 10/121 (2013.01)

(58) Field of Classification Search
CPC ...... F01P 11/16; F01P 11/18; F02M 25/0731; F02M 25/0738; F02D 2041/0067
USPC .......... 123/568.12, 542; 701/108; 60/298, 320
See application file for complete search history.

(56) References Cited

U.S. PATENT DOCUMENTS

| | | | |
|---|---|---|---|
| 7,461,640 B1 * | 12/2008 | Agee ...................... | F01P 11/18 123/568.12 |
| 2007/0129874 A1 * | 6/2007 | Bays ....................... | F01P 7/04 701/102 |
| 2011/0125361 A1 * | 5/2011 | Weber ..................... | F01P 11/18 701/31.4 |

* cited by examiner

*Primary Examiner* — Mahmoud Gimie
(74) *Attorney, Agent, or Firm* — Jack D. Nimz; Jeffrey P. Calfa

(57) ABSTRACT

Methods and systems for controlling the conditions of a coolant for the cooler of an exhaust gas recirculation system are disclosed. The system determines coolant pressure at predetermined location of the cooler. The system also senses the actual temperature of the coolant at a predetermined location of the cooler. The system also determines a coolant boiling temperature at the determined coolant pressure. Using the determined coolant pressure, the system may control engine operation so as to prevent coolant from reaching boiling in the cooler. An engine derate power factor may be determined to control the amount of fuel delivered to the engine, such as reducing the amount of fuel delivered through the fuel injectors. The amount of delivered fuel may be derated until an adjusted coolant temperature falls a predetermined amount below the coolant boiling temperature.

10 Claims, 5 Drawing Sheets

DERATE STRATEGY FOR EGR COOLER PROTECTION

BACKGROUND

Combustion engines, such as, diesel or gasoline engines, often employ emission control systems that are designed to reduce the emission of pollutants from the engine. For example, some combustion engines may utilize exhaust gas recirculation (EGR) systems for reducing nitrogen oxide (NOx) emissions. The EGR systems are configured to recirculate cooled engine exhaust gas back into the combustion chamber of the engine to reduce the volume of air and/or other combustible matter in the cylinder or the pre-combustion mixture. By replacing a portion of the oxygen or combustible material present during the combustion process with cooled, spent exhaust gas, EGR systems may reduce the temperatures obtained during combustion process and thereby reduce the amount of NOx that is generated by the combustion.

Before the EGR system recirculates exhaust gas into the combustion chamber, the exhaust gas is typically cooled by an EGR cooler or heat exchanger. A coolant, such as antifreeze mixtures or non-aqueous solutions, among others, typically circulates through the EGR cooler. According to some designs, the coolant and/or the heated exhaust gases flow through tubes, a jacket, or other forms of conduits in the EGR cooler. The EGR cooler may be configured so that heated exhaust gases flow around and/or over tubes containing flowing coolant, or vice versa, causing heat from the exhaust gas to be transferred to the coolant. The EGR cooler may also include fins that assist with the transfer of heat from the exhaust gas to the coolant.

While the temperature of the coolant is intended to increase as the coolant absorbs heat from the exhaust gas in the EGR cooler, the EGR cooler, as well as other EGR system components, may be damaged if the coolant exceeds desired temperatures, such as when the coolant reaches or exceeds its boiling temperature. Complicating matters is the fact that the temperature at which the coolant boils changes as the coolant's pressure in the EGR cooler changes.

Undesirable fluctuations in coolant temperature, such as temperature fluctuations above and below boiling temperatures, may cause thermal fatigue within the EGR cooler. Thermal fatigue may damage the EGR cooler, including, for example, cracking of the tubes or jackets that transport the coolant in the EGR cooler, among other EGR cooler components. To avoid these problems, EGR coolers are often oversized. Using oversized components takes up valuable space in the engine compartment and also increases manufacturing costs and component weight. Another approach is to increase rate of coolant flow in the EGR cooler. However, increasing the coolant flow rate may cause or expedite erosion in the tubes or other portions of the EGR cooler that transport the coolant. Further, it typically becomes increasingly difficult to continually oversize the EGR cooler and/or increase coolant flow rate as emission requirements become more stringent.

SUMMARY

An illustrated embodiment is a method for controlling the temperature of coolant circulating in the cooler of an exhaust gas recirculation system for a combustion engine. The method includes determining coolant pressure at a predetermined location of the cooler and sensing the actual temperature of the coolant at a predetermined location of the cooler. The method also includes determining a coolant boiling temperature at the determined coolant pressure, as well as controlling engine operation as a function of the actual coolant temperature and the determined coolant boiling temperature. According to certain embodiments, the controlling method includes reducing the amount of fuel delivered to the engine when the actual coolant temperature exceeds a predetermined percentage of the determined coolant boiling temperature.

Another embodiment is a system for controlling the temperature of coolant circulating in the cooler of an exhaust gas recirculation system for a combustion engine. The system may include a coolant pressure sensor positioned at a predetermined location of the cooler. Additionally, the system may also have a coolant temperature sensor positioned at a predetermined location of the cooler. The system further includes a controller that may be configured to receive a signal indicative of the sensed coolant pressure and a signal indicative of the sensed coolant temperature. The controller may further be configured to determine a coolant pressure within the cooler. The controller may also be configured to determine a coolant boiling temperature at the determined coolant pressure. According to certain embodiments, the controller is an engine control unit that is configured to reduce the amount of fuel delivered to the engine when the sensed coolant temperature exceeds a predetermined percentage of the determined coolant boiling temperature.

DETAILED DESCRIPTION

Figure 1:
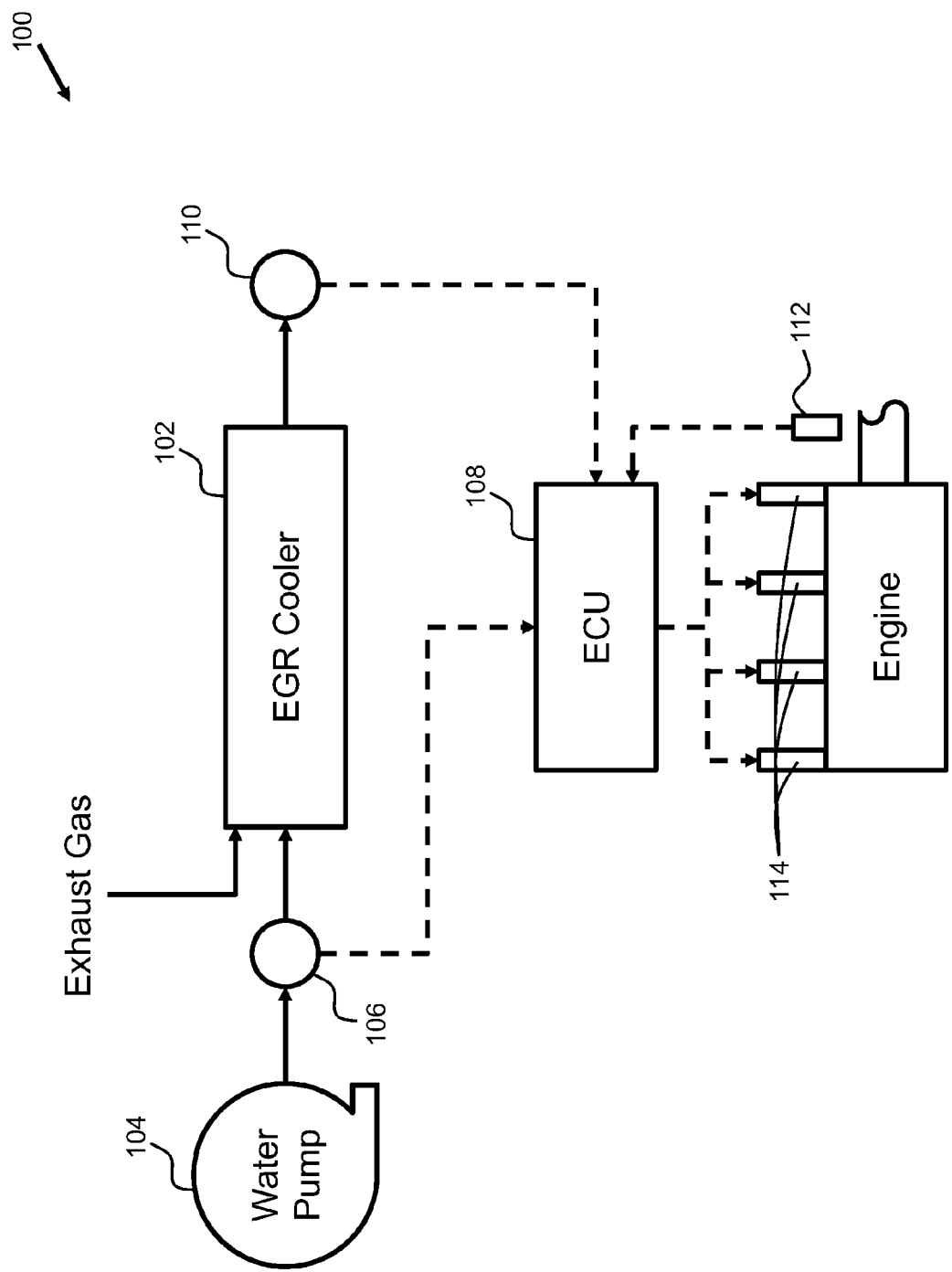
FIG. 1 is a diagram of a system for actively controlling coolant temperature within an EGR cooler.

FIG. 1 is a diagram of a system for actively controlling coolant conditions within an EGR cooler 102 of an EGR system 100 for use with combustion engines. The system may include a water pump 104 for pumping coolant into the EGR cooler 102. A pressure sensor 106 senses the pressure of the coolant and transmits a signal representative of the sensed pressure to a controller 108, such as engine control unit. In the illustrated embodiment, the pressure sensor 106 is positioned upstream of the cooler to detect the pressure of coolant entering the EGR cooler 102. Alternatively, the pressure sensor 106 may be positioned inside, downstream, or at the output of the EGR cooler 102. The monitoring system also includes a temperature sensor 110 that senses the coolant temperature and transmits a representative signal to the controller 108. The temperature sensor 110 is illustrated in FIG. 1 as being downstream or at the output of the EGR cooler 102. Alternatively, the temperature sensor 110 may be positioned within the EGR cooler 102, for example. An engine speed sensor 112 detects engine speed and transmits a signal representative thereof to the controller 108.

The controller 108 includes one or more processors and/or control logic for controlling the temperature of the coolant within the EGR cooler 102 in response to sensed parameter such as coolant pressure and coolant temperature. According to one embodiment, the controller implements a derate strategy for controlling engine operation when the actual coolant temperature is at or near the coolant's boiling temperature. More specifically, the controller 108 determines, e.g., calculates, a boiling temperature of the coolant in the EGR cooler at the current coolant pressure. The controller then determines an engine derate power factor based on the calculated coolant boiling temperature and the actual coolant temperature. The derate power factor provides an indication of the amount or percentage (if any) that engine power should be reduced from the power being requested by the user. The requested power may be based on sensed throttle pedal position, for example. The derate strategy may regulate engine power as a function of the ratio of the current coolant temperature to the current coolant boiling temperature. Specifically, when this ratio is below a first threshold percentage, such as 90%, no engine derating may be required. When the ratio is between the first threshold, e.g., 90%, and a second threshold, e.g., 100%, the strategy may derate the requested engine power as a function of this ratio. For example, as the ratio increases, the percentage the engine is derated may be likewise increased. Derating the engine impacts the horsepower output by the engine. Therefore, a balance is typically needed between the need to prevent damage to the EGR cooler 102, as achieved by a derating the power, and the amount of engine power being sacrificed during the derating process. To address this issue, the derate strategy may limit the maximum amount that engine power can be derated. For example, the maximum derate amount may be set at 70% of requested, e.g., a maximum reduction of 30%. This maximum derate value may be used when the ratio of current coolant temperature to the current coolant boiling temperature reaches or exceeds a predetermined threshold, such as 100%. By reducing the amount of fuel injected through the fuel injectors 114 in accordance with the derate power factor, the engine control unit 108 may reduce the temperatures obtained by the combustion process, and thereby reduce the temperature of the exhaust gas. A reduction in the exhaust gas temperature may correspond to a reduction in the heat that is transferred to the coolant in the EGR cooler 102, and thereby allow for a reduction in the coolant temperature.

Figure 2:
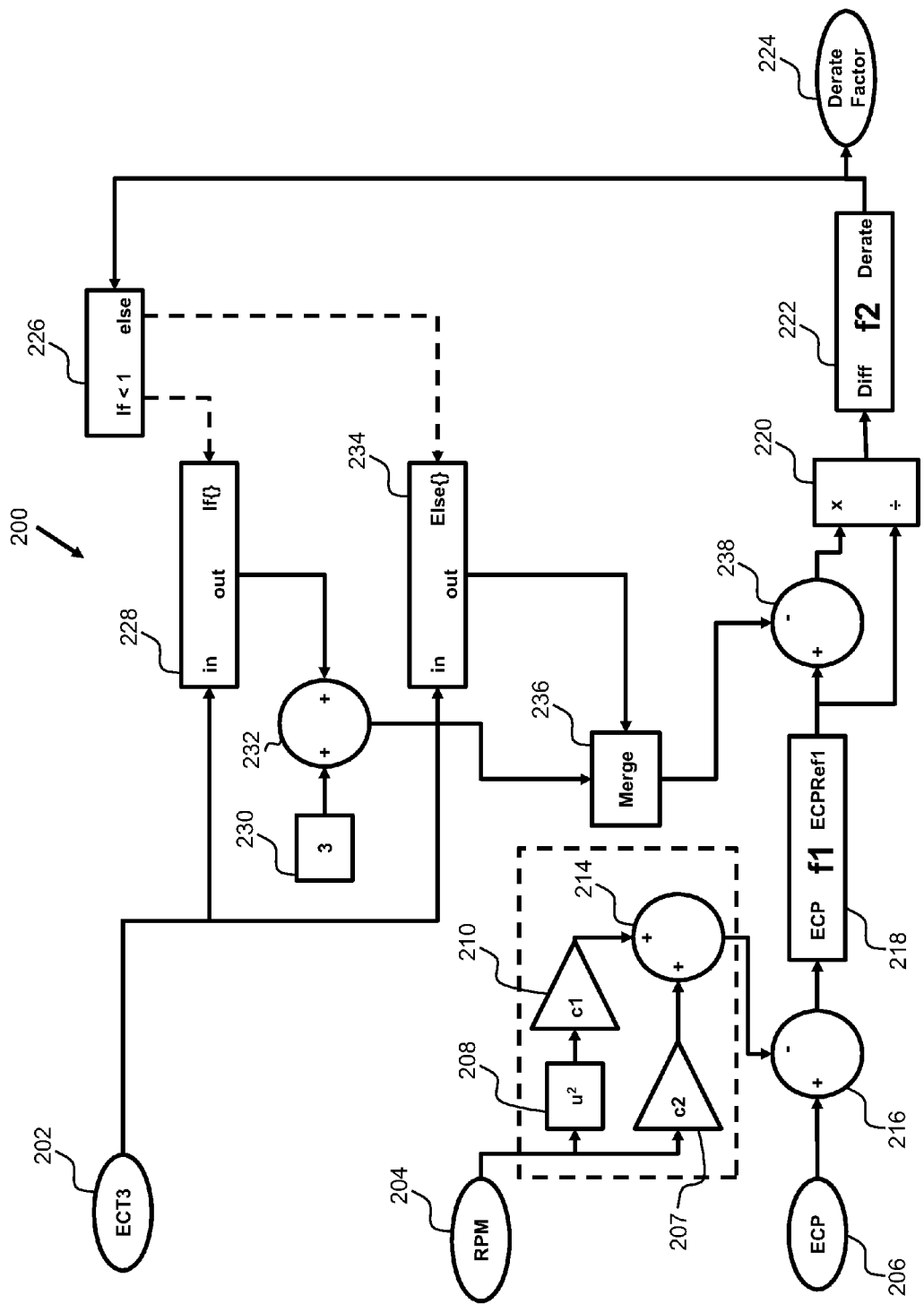
FIG. 2 is exemplary control logic for calculating a derate power factor using based on operating conditions of the EGR cooler of FIG. 1.
Figure 3:
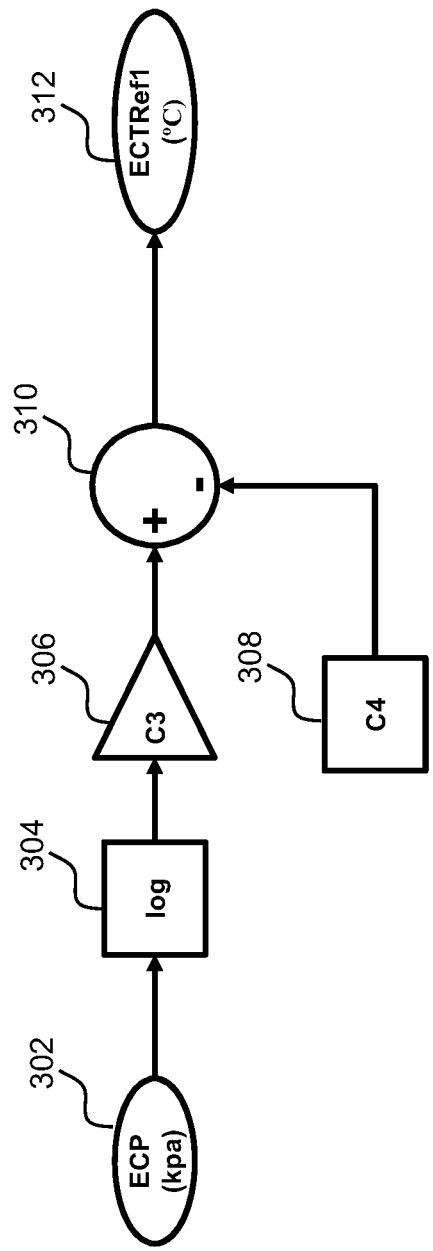
FIG. 3 is exemplary control logic for calculating a boiling temperature for a coolant as a function of coolant pressure.
Figure 4:
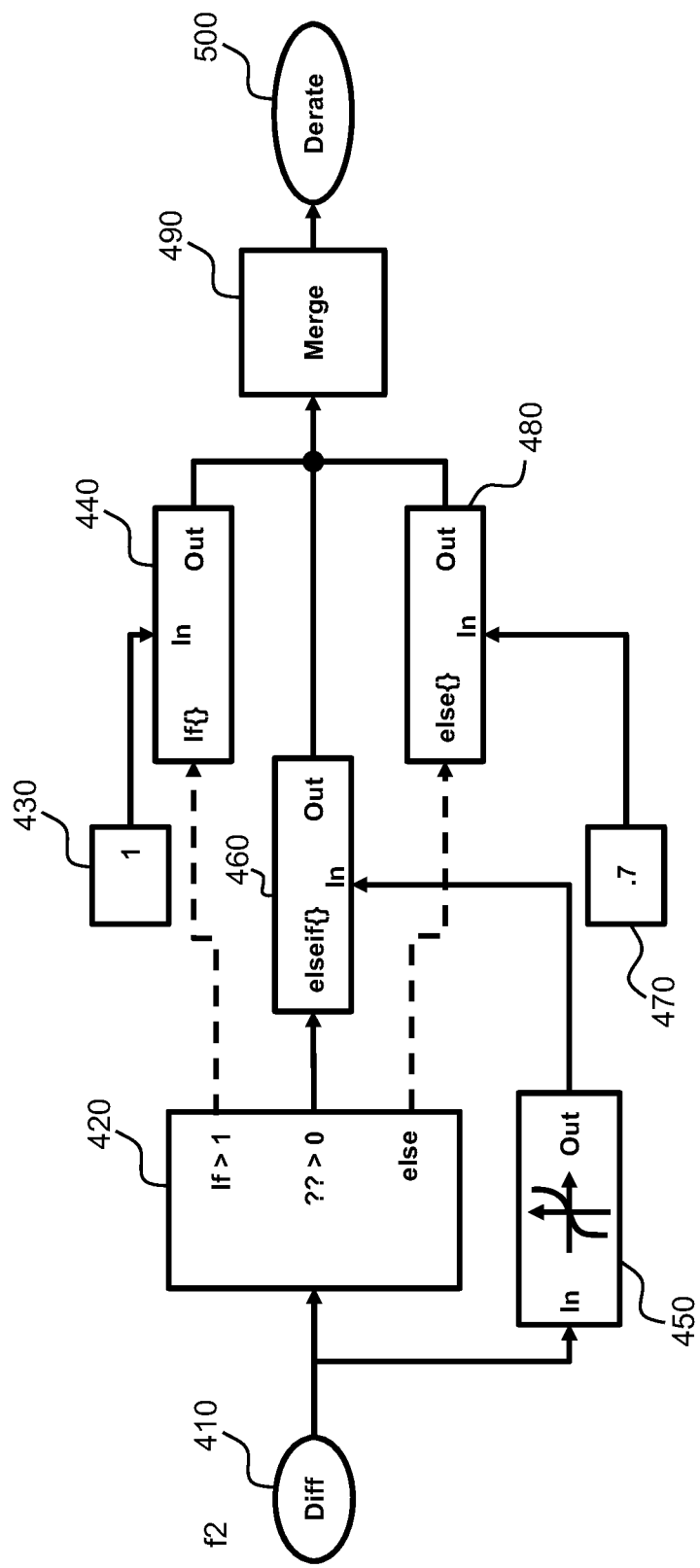
FIG. 4 is exemplary logic for calculating an engine derate power factor as a function of calculated coolant boiling temperature and actual coolant temperature.

FIG. 2-4 are diagrams for controlling coolant temperature in the system of FIG. 1. The control logic determines a derate power factor as a function of the actual coolant temperature (CT) and a coolant boiling temperature (BT), where the coolant boiling temperature (BT) is calculated based on the current coolant pressure at a predetermined location. For example, the coolant pressure may be the pressure at the inlet or outlet of the cooler. In the illustrated embodiment, the control logic utilizes the coolant pressure at the outlet of the cooler. The controller 108 uses the derate power factor to control operation of the engine to regulate coolant temperature in the ERG cooler 102.

As just noted, the coolant boiling temperature (BT) is determined based on the coolant pressure ($CP_{OUT}$) at the outlet of the cooler 102. The coolant outlet pressure ($CP_{OUT}$) may be determined using a pressure sensor (not shown) at or near the outlet of the cooler 102. Alternatively, as shown in the system of FIG. 1 and the logic of FIG. 2, the current coolant pressure ($CP_{OUT}$) may be determined based on the coolant pressure ($CP_{IN}$) sensed at the input to the EGR cooler 102 and the calculated drop in coolant pressure ($CP_A$) across the EGR cooler 102. Accordingly, at steps 202 and 206, the control logic reads the coolant inlet pressure ($CP_{IN}$) and engine speed from the corresponding sensors 106, 112. The engine speed from step 204 is processed by transfer function 207 that provides a predicted coolant pressure change across the EGR cooler 102. According to the illustrated embodiment, at step 208, the engine speed, as measured in revolutions per minute ("u") from step 204, may be squared ("$u^2$"). The value from step 208 may then be amplified by a first constant ("c1") at step 210, with the product being increased at step 214 by the addition of the second constant ("c2") provided by step 212. The first and second constants (c1, c2) account for variables in the system, such as the effect the hardware of the EGR cooler 102, for example, the shape, size, and configuration of the coolant tubes or jacket, has on the pressure of the coolant as the coolant moves through the EGR cooler 102, as well as the physical properties of the cooling media being utilized. According to certain embodiments, the constants (c1, c2) may be calibrated values based on the coolant jacket restriction curve of the EGR cooler 102 as a function of engine speed and cooling media physical properties. The value obtained at step 214 represents the predicted change in coolant pressure ($CP_A$) across the EGR cooler 102.

At step 216, the coolant outlet pressure ($CP_{OUT}$) is determined by subtracting the calculated pressure drop ($CP_A$) from the coolant inlet pressure ($CP_{IN}$). At step 218, control logic calculates the boiling temperature (BT) for the coolant at the current coolant outlet pressure ($CP_{OUT}$). FIG. 3 provides an exemplary boiling temperature calculation for a coolant that is a 50/50 mixture of ethylene glycol and water according to the illustrated embodiment. As shown in FIG. 3, the coolant pressure ($CP_{OUT}$) is provided at step 302 of FIG. 3. The coolant pressure $CP_{OUT}$ is then inserted into a logarithm at step 304, which is representative of a boiling curve for the particular coolant used in the EGR cooler 102. The value output from the logarithm is then multiplied and subtracted by constants (c3, c4) for the particular coolant composition to arrive at the boiling temperature (BT) of the coolant at the current coolant outlet pressure. As will be appreciated, the constants c3, c4 provided at steps 306 and 308 may be based on a number of factors, including, for example, the particular composition of the coolant being used in the EGR cooler 102. In an exemplary embodiment where the coolant is a 50/50 mixture of ethylene glycol and water, the constants c1, c3 may 31.695 and 37.917, respectively. In this embodiment, the value output from step 304 is amplified by the constant c3, e.g., 31.695, at step 306. The product from step 306 is then reduced by the constant c4, e.g., 37.917, at step 310. The value obtained at step 310 is then represented at step 312 as being the predicted coolant boiling temperature ("BT") at the current coolant pressure.

Referring again to FIG. 2, at step 222, the coolant boiling temperature (BT) and the actual coolant temperature (CT) are used to calculate a temperature differential percentage (DIFF) in accordance with the following formula:

$$DIFF = \frac{BT - CT}{BT}$$

The temperature differential percentage (DIFF) from step 220 is provided to the function (f2) at step 222 to determine the engine derate power factor. FIG. 4 is exemplary logic of a function that can be executed at step 222 for determining the engine derate power factor. Step 410 provides the temperature differential percentage, as determined at step 220. At step 420 in FIG. 4, temperature differential percentage is fed to an "if" function, wherein the temperature differential percentage is compared to a predetermined temperature differential margin. For illustrative purposes, the predetermined temperature margin at step 420 has been set at "0.1". If the temperature differential percentage from step 410 is above "0.1", then the logic provides requires that a derate value of "1" from step 430 is provided to a first output at step 440. A derate power factor of "1" indicates that no derate strategy is to be applied, and that the requested amount of fuel be delivered through the fuel injectors. In other words, in the illustrated embodiment, the engine is not derated so long as the actual coolant temperature does not exceed ninety percent of the calculated coolant boiling temperature.

If the temperature differential percentage from step 410 is between the predetermined temperature margin of "0.1" and a value of "0", as indicated by the "elseif>0" at step 420, then the engine control unit 108 determines a derate power factor. In other words, the engine is not derated in accordance with a derate power factor if the current coolant temperature is between 90 and 100 percent of the calculated coolant boiling temperature. The derate power factor may be determined by feeding the temperature differential percentage into a derate table at step 450, where a derate power factor is returned that is indicative of the percentage the requested fuel, or engine power, should be reduced to reduce the combustion temperatures. For example, if the temperature differential percentage is slightly below 0.1, such as 0.098, then the derate table at step 450 may indicate that the engine power should be only slightly derated, and thereby return a derate power factor of 0.95. Such a derate power factor may indicate that the engine control unit 108 will reduce the amount of fuel provided through the fuel injectors to 95% of the requested amount. According to certain embodiments, the reduction in fuel amounts delivered through the injectors 114 may be gradual or rapid. The derate power factor from the derate table at step 450 is provided to a second output at step 460.

In the event that the temperature differential percentage is at or below 0, indicating the actual coolant temperature is at or above the calculated coolant boiling temperature, which may indicate that the coolant within the EGR cooler 102 is boiling, embodiments may provide a maximum derate power factor. For example, if the value provided from step 410 to the logic at step 420 falls within the "else" category, then at step 470 a maximum derate power factor, such as 0.7 for example, is provided to a third output at step 480. Because a derate power factor is intended to reduce the amount of fuel provided during the combustion process, derating the power of the engine adversely impacts the horsepower outputted by the engine. Therefore, typically, a balance is needed between the need to prevent damage to the EGR cooler 102, as achieved by a derating the power, and the amount of engine power being sacrificed during the derating process.

At step 490, the outputs from steps 440, 460, and 480 are merged to determine which one of the three outputs 440, 460, 480 is providing a derate power factor or true response, and which two outputs are not providing a derate power factor, or are providing a false response. For example, according to certain embodiments, if the temperature differential percentage is above 0.1, then the first output 440 will provide a derate power factor of 1, while the second and third outputs 460, 480 provide no derate power factor or provide a false response. The derate power factor is then provided at step 500, which is also shown at step 222 in FIG. 2. The derate power factor is then applied by the engine control unit 108 to the amount of fuel that will be injected through the fuel injectors 114.

After determining the derate power factor, the control logic 200 may create an exit strategy for determining when to no longer derate the engine power. For example, the derate power factor calculated at step 222 may be feed back into the control logic 200 to step 226. Step 226 may perform an "if" function. For example, if the derate power factor is less than 1, meaning a derate strategy has been employed as previously discussed, then a sensed coolant temperature from the temperature sensor 110 is provided at output 228. According to an embodiment, the sensed temperature is then adjusted to create an adjusted temperature. For example, step 230 provides an adjustment factor, such as a numerical number, by which the temperature provided at output 228 is adjusted. According to the illustrated embodiment, the adjustment factor from step 230 is 3° Fahrenheit. The adjustment factor may be a constant numerical temperature. An adjustable temperature based on a number of variables, including, for example, the duration of the derate strategy, or a formula that inputs the sensed temperature. According to the illustrated embodiment, at step 232, the sensed temperature is increased by 3° Fahrenheit. By increasing the sensed temperature, the control logic creates a temperature difference or offset between the actual coolant temperature and the temperature utilized by the control logic when determining whether to continue with the derating the engine power. By using such a temperature offset, the illustrated embodiment attempts to ensure that the temperature of the coolant falls adequately below the boiling temperature so that once the derate strategy becomes inactive, another derate strategy is not relatively quickly initiated. However, if at step 226 the derate power factor is equal to 1, then as discussed above with respect to steps 420, 430, and 440 in FIG. 4, a derate strategy is not being employed, and the unadjusted sensed temperature is provided to output 234.

At step 236, the logic identifies that either the adjusted temperature is being provided from step 232, or the sensed temperature is being provided by output 234. At step 238, the temperature from step 236 is subtracted from the predicted coolant boiling temperature provided by step 218, with that value then being divided by the predicted coolant boiling temperature at step 220 to calculate an adjusted temperature differential percentage. The adjusted temperature differential percentage may then go through the logic to determine if the temperature differential percentage is above the predetermined temperature differential margin. If the adjusted temperature differential percentage is above the predetermined temperature differential margin, such being found at step 420 to be greater than 0.1, then a derate factor of 1 may be provided by step 430, and the derate power strategy may be terminated. According to certain embodiments the same derate power factor for a single derate event or strategy. According to other embodiments, the adjusted temperature differential percentage may be used to continually adjust the derate strategy, and in particular the derate power factor, as the coolant temperature recedes from the coolant boiling temperature.

Figure 5:
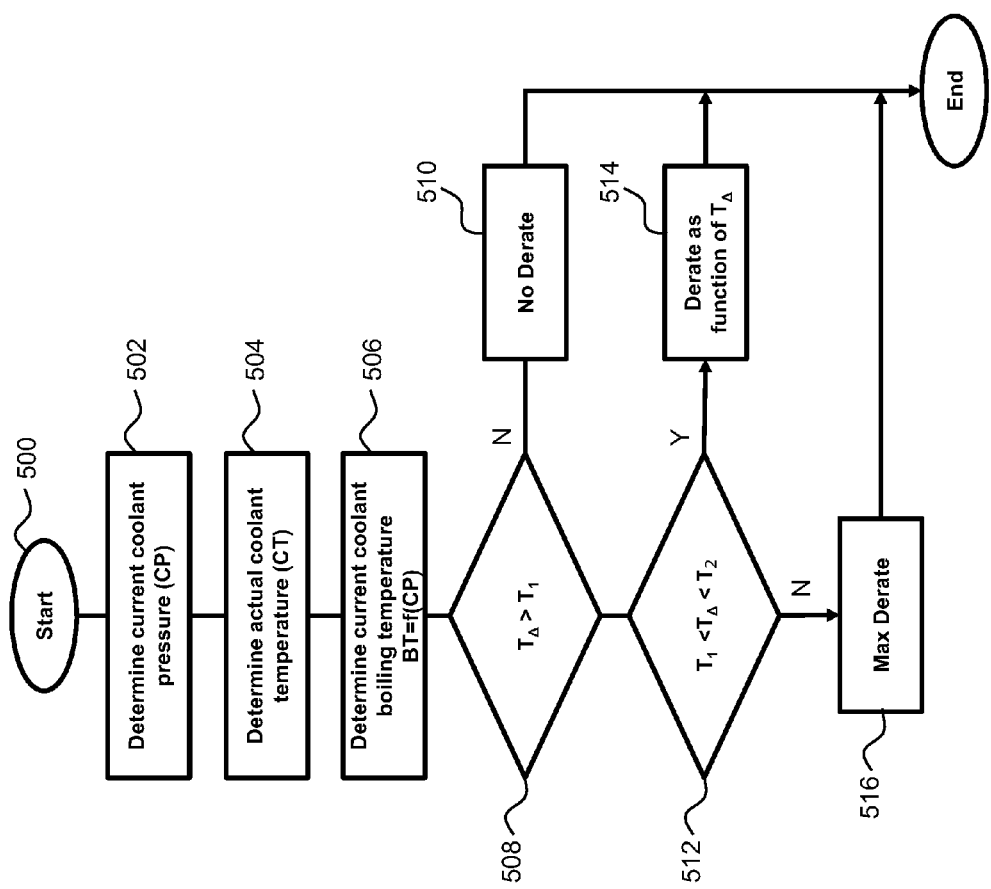
FIG. 5 is a flow diagram illustrating a method of controlling coolant temperature within an EGR cooler.

FIG. 5 is a flow diagram illustrating a method of controlling coolant temperature within an EGR cooler. In step 502, the method determines a current coolant pressure at a predetermined location of the cooler. This may be accomplished by sensing the pressure of coolant at an outlet of the EGR cooler 102. Alternatively, as explained above, the coolant pressure may be determined based on the pressure sensed at the cooler inlet and a calculated pressure drop across the cooler.

Next, at step 504, the method determines the actual coolant temperature (CT), e.g., based on the output of the temperature sensor 110. Control is then passed to the step 506 where the method determines a coolant boiling temperature (BT) at the current coolant pressure (CP), e.g., as discussed above in connection with FIGS. 2-4.

Control is then passed to step 508 where the method determines the difference ($T_A$) between the coolant boiling temperature (BT) and the actual coolant temperature (CT). Next, in step 508, the method determines if this difference exceeds a predetermined threshold T1. If the difference ($T_A$) exceeds predetermined threshold, control is passed to the step 510, where no engine power derate is indicated. More specifically, when the difference ($T_A$) exceeds the threshold T1, actual coolant temperature determined to be sufficiently below the current boiling temperature of the coolant and, thus, the engine is not derated.

If the difference between the current boiling temperature and the current coolant temperature does not exceed the threshold T1, control is passed to the step 512. In step 512, the method determines whether the difference ($T_A$) between the boiling temperature (BT) and the actual coolant temperature (CT) falls between the first threshold T1 and a second threshold T2 that is lower than the first threshold. In the illustrated embodiment, the second threshold T2 may, for example, be zero. If the temperature difference ($T_A$) falls in this range, control is passed to the step 514 where engine power is derated as a function of the temperature difference. Otherwise, control is passed to the step 516 where engine power is derated by a maximum allowable amount.

The method of FIG. 5 uses the difference between actual coolant temperature (CT) and calculated boiling temperature (BT) to determine when (and how much) to derate the engine. It will be appreciated that the method could use alternative measures, such as the ratio of actual temperature to the calculated boiling temperature, e.g., as discussed above. Further, as discussed above, the method may also include determining an adjusted coolant temperature so as to ensure that, when the derate strategy ceases, the actual coolant temperature is sufficiently below the temperature at which a derate would be re-initiated.

The invention claimed is:

1. A method for controlling the temperature of coolant circulating in the cooler of an exhaust gas recirculation system for a combustion engine comprising:
    determining coolant pressure at a predetermined location of the cooler;
    sensing the actual temperature of the coolant at a predetermined location of the cooler;
    determining a coolant boiling temperature at the determined coolant pressure;
    controlling engine operation as a function of the actual coolant temperature and the determined coolant boiling temperature;
    wherein the step of controlling comprises reducing the amount of fuel delivered to the engine when the actual coolant temperature exceeds a predetermined percentage of the determined coolant boiling temperature; determining an engine derate power factor as a function of the actual coolant temperature and the determined coolant boiling temperature; controlling the amount of fuel delivered to the engine as a function of the derate power factor; and
    wherein the step of controlling further comprises determining an adjusted coolant temperature by adding a safety factor to the sensed coolant temperature, and wherein the step of derating the amount of fuel injected through fuel injectors ceases when the adjusted coolant temperature falls below the coolant boiling temperature by a predetermined amount.

2. The method of claim 1, further including adjusting the engine derate factor as the difference between the adjusted coolant temperature and the coolant boiling temperature increases.

3. The method of claim 1, wherein the step of determining current coolant pressure comprises sensing coolant pressure at an outlet of the cooler.

4. The method of claim 1, wherein the step of determining coolant pressure further comprises:
    sensing coolant pressure upstream of the cooler;
    calculating a pressure drop corresponding to the drop in coolant pressure across the cooler; and
    determining the coolant pressure at an outlet of the cooler as a function of the sensed upstream coolant pressure and the calculated pressure drop.

5. A system for controlling the temperature of coolant circulating in the cooler of an exhaust gas recirculation system for a combustion engine comprising:
    a coolant pressure sensor positioned at a predetermined location of the cooler;
    a coolant temperature sensor positioned at a predetermined location of the cooler; and
    a controller configured to receive a signal indicative of the sensed coolant pressure and a signal indicative of the sensed coolant temperature, the controller further configured to determine a coolant pressure within the cooler, the controller also configured to determine a coolant boiling temperature at the determined coolant pressure;
    wherein the controller is an engine control unit that is configured to reduce the amount of fuel delivered to the engine when the sensed coolant temperature exceeds a predetermined percentage of the determined coolant boiling temperature; and
    wherein the engine control unit is further configured to determine an engine derate factor as a function of the sensed coolant temperature and the determined coolant boiling temperature; and
    the engine control unit controls the amount of fuel delivered to the engine through one or more fuel injectors as a function of the derate power factor.

6. The system of claim 5, wherein the engine control unit is further configured to determine an adjusted coolant temperature by adding a safety factor to the sensed coolant temperature, and wherein the amount of fuel injected through the one or more fuel injectors is no longer derated when the adjusted coolant temperature falls below the coolant boiling temperature by a predetermined amount.

7. The system of claim 6, wherein the engine control unit is further configured to adjust the engine derate factor as the difference between the adjusted coolant temperature and the coolant boiling temperature increases.

8. The system of claim 5, wherein the coolant pressure sensor is positioned at an outlet of the cooler.

9. The system of claim 5, wherein the coolant pressure sensor is positioned upstream of the cooler, and the controller is configured to calculate a pressure drop in coolant pressure across the cooler to determine a coolant pressure at the outlet of the cooler.

10. The system of claim 5 further including an engine speed sensor, wherein the determined coolant temperature is at least based in-part on the sensed coolant pressure and sensed engine speed.

* * * * *